United States Patent [19]

Daly

[11] 4,352,782
[45] Oct. 5, 1982

[54] CATALYTIC GAS GENERATOR

[75] Inventor: James M. Daly, Kirkland, Wash.

[73] Assignee: Rocket Research Company, Redmond, Wash.

[21] Appl. No.: 236,575

[22] Filed: Feb. 20, 1981

[51] Int. Cl.³ .............................................. F01N 3/10
[52] U.S. Cl. .................................... 422/179; 60/299; 422/180; 422/221
[58] Field of Search ............... 422/179, 181, 218, 221, 422/239, 311, 177, 180; 60/39.46 M, 299–302; 48/128

[56] References Cited

U.S. PATENT DOCUMENTS

| | | | |
|---|---|---|---|
| 2,972,227 | 2/1961 | Allen | 60/39.46 M |
| 3,581,504 | 6/1971 | Andrus | 60/39.46 M |
| 3,653,843 | 4/1972 | Seelander | 422/311 |
| 4,158,037 | 6/1979 | Aoyama | 422/179 |
| 4,163,042 | 7/1979 | Lynch | 422/179 |

Primary Examiner—Richard L. Chiesa
Attorney, Agent, or Firm—Christensen, O'Connor, Johnson & Kindness

[57] ABSTRACT

An improved catalytic gas generator, of the type used, for example, in a monopropellant hydrazine rocket engine includes a dynamic catalyst bed retention device. The dynamic retention device comprises a compression band surrounding a generally cylindrical catalyst bed that is axially restrained at both ends. A torsional force is applied to the compression band, which converts the torsional force into a radially inwardly directed compression force. As voids develop in the catalyst bed upon repeated impulsing, the inwardly directed compressive force redistributes the catalyst bed so as to fill the voids. The retention device thus allows the catalyst bed to perform at peak efficiency yielding a gas generator that can be repeatedly pulsed with uniformly reproducible results.

8 Claims, 5 Drawing Figures

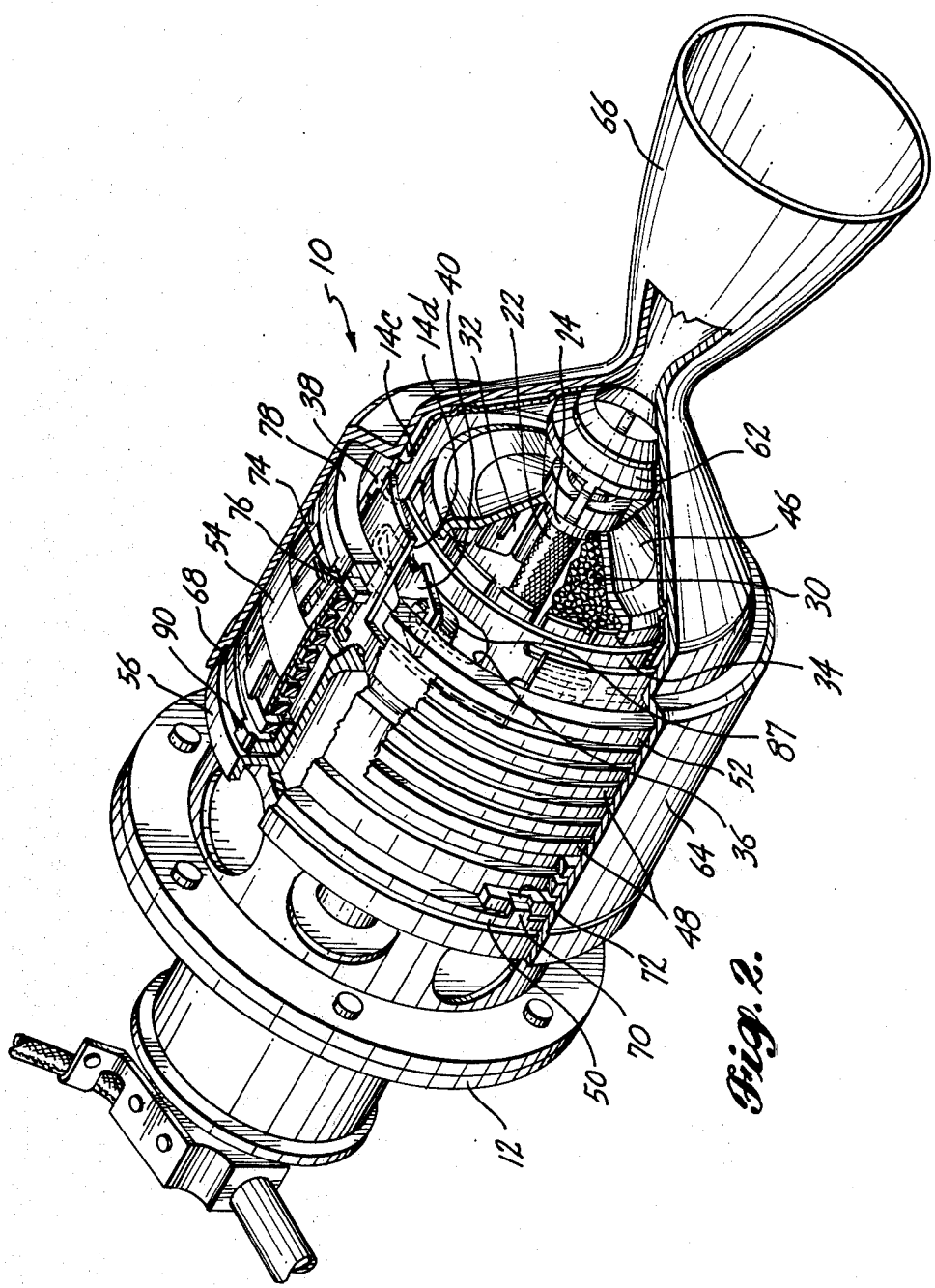

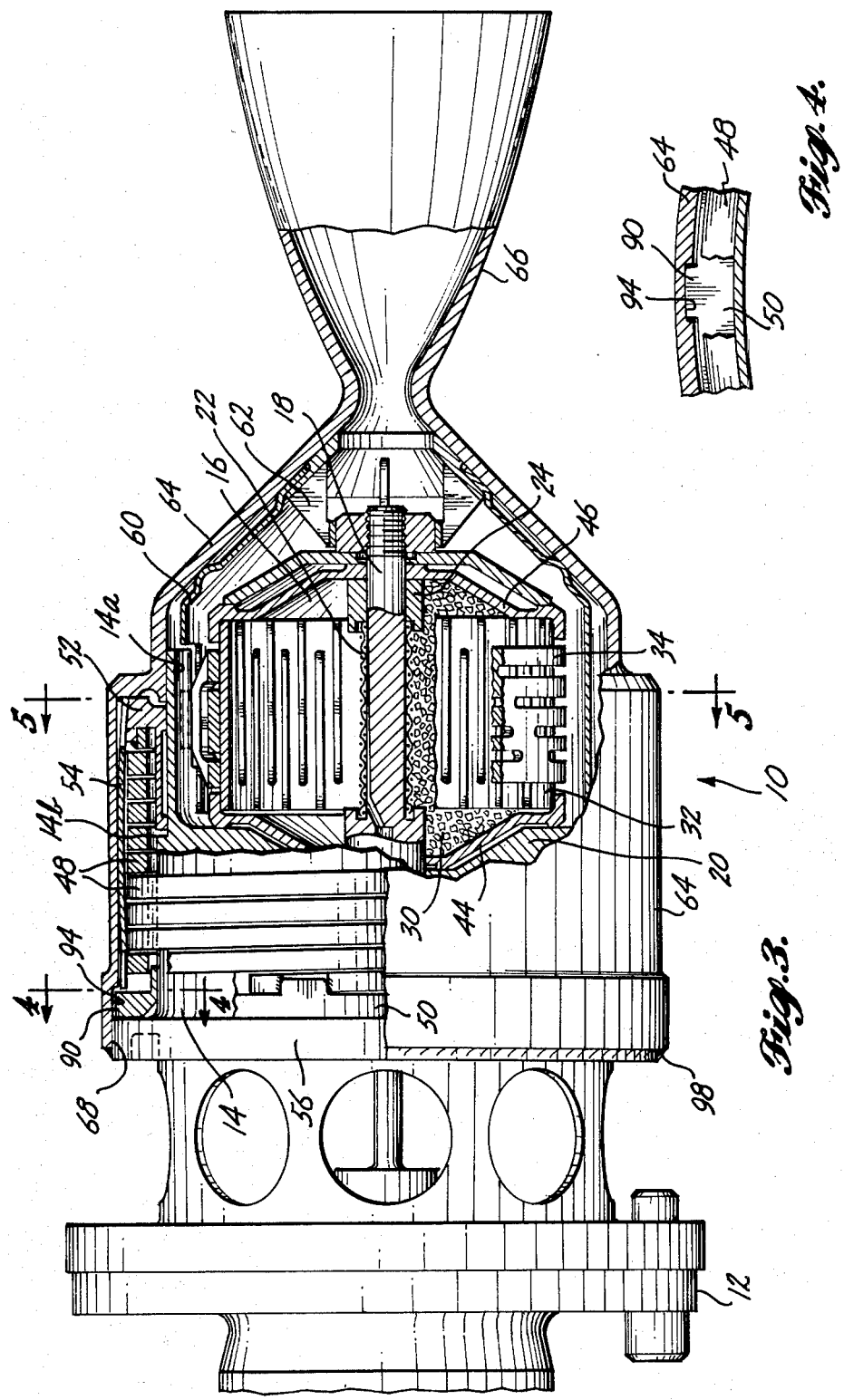

CATALYTIC GAS GENERATOR

BACKGROUND OF THE INVENTION

The present invention relates to catalytic gas generators for producing high-temperature gases from a liquid, particularly generators used in monopropellant rocket engines and other power generating applications, and most particularly to an improvement relating to catalyst beds employed in such gas generators.

Small rocket engines of the type utilized in space satellites are generally of monopropellant design employing a catalytic gas generator to convert a liquid propellant such as hydrazine into a high-temperature gas. Such engines incorporate a catalyst bed within their thrust chambers. The propellant is injected into the catalyst bed where it reacts to produce a high-temperature gas. The gas exits from the catalyst bed and is expanded through a conventional nozzle system to produce thrust. The primary life-limiting component of such monopropellant rocket engines is the catalyst used for decomposing the propellant into a high-temperature gas. Catalyst attrition resulting from loosening of the catalyst bed due to differential thermal expansion and contraction ultimately creates voids in the catalyst bed causing both a reduction in efficiency and ultimate destruction of the catalyst bed so that it is incapable of performing its intended function. Such catalyst attrition has been indentified as one of the major causes limiting the life capability of catalytic gas generators and thus the rocket engines in which they are utilized.

Prior attempts at reducing the deleterious effect of void formation in catalytic gas generators, although providing some improvement, have not adequately solved the problem so that the life of such a rocket engine can reliably exceed $10^6$ pulses. For example, prior attempts to dynamically retain the catalyst bed, that is, to dynamically change the bed boundaries as voids occur by employing axially movable boundary plates, have met with limited success because, among other reasons, the dynamic retention devices have been exposed directly to the relatively hot decomposition gases of the propellant.

It is an object of the present invention to provide a catalyst bed for use in a catalytic gas generator, for example, of the type used in a monopropellant rocket engine, that has a long life, and preferably a catalyst bed that can reliably achieve up to and exceed $10^6$ impulses. It is a further object of the present invention to provide a catalyst bed retention device, and more particularly, a dynamic retention device that is not susceptible to the problems encountered with prior art devices.

SUMMARY OF THE INVENTION

In accordance with the foregoing objects and other objects that will become apparent to one of ordinary skill upon reading the following specification, the present invention provides an improved catalytic gas generator that includes a body means defining a generating chamber, a propellant inlet, a propellant outlet, and a generally cylindrical catalyst bed. The improvement comprises a first means surrounding and radially confining the catalyst bed. The first means is movable radially inwardly relative to the catalyst bed. The improvement further comprises a second means cooperating with the first means to apply a biasing force directed radially inwardly relative to the bed. Preferably, this biasing force is uniformly applied around the first means.

BRIEF DESCRIPTION OF THE DRAWINGS

A better understanding of the present invention can be derived by reading the ensuing specification in conjunction with the accompanying drawings wherein:

FIG. 2 is an assembled isometric view of the engine shown in exploded form in FIG. 1;

FIG. 3 is a longitudinal view in partial cross section of the assembled engine as shown in FIG. 2;

FIG. 4 is a segment of the outer housing shown in cross section taken along section line 4—4 of FIG. 3.

DETAILED DESCRIPTION OF THE INVENTION

Figure 1:
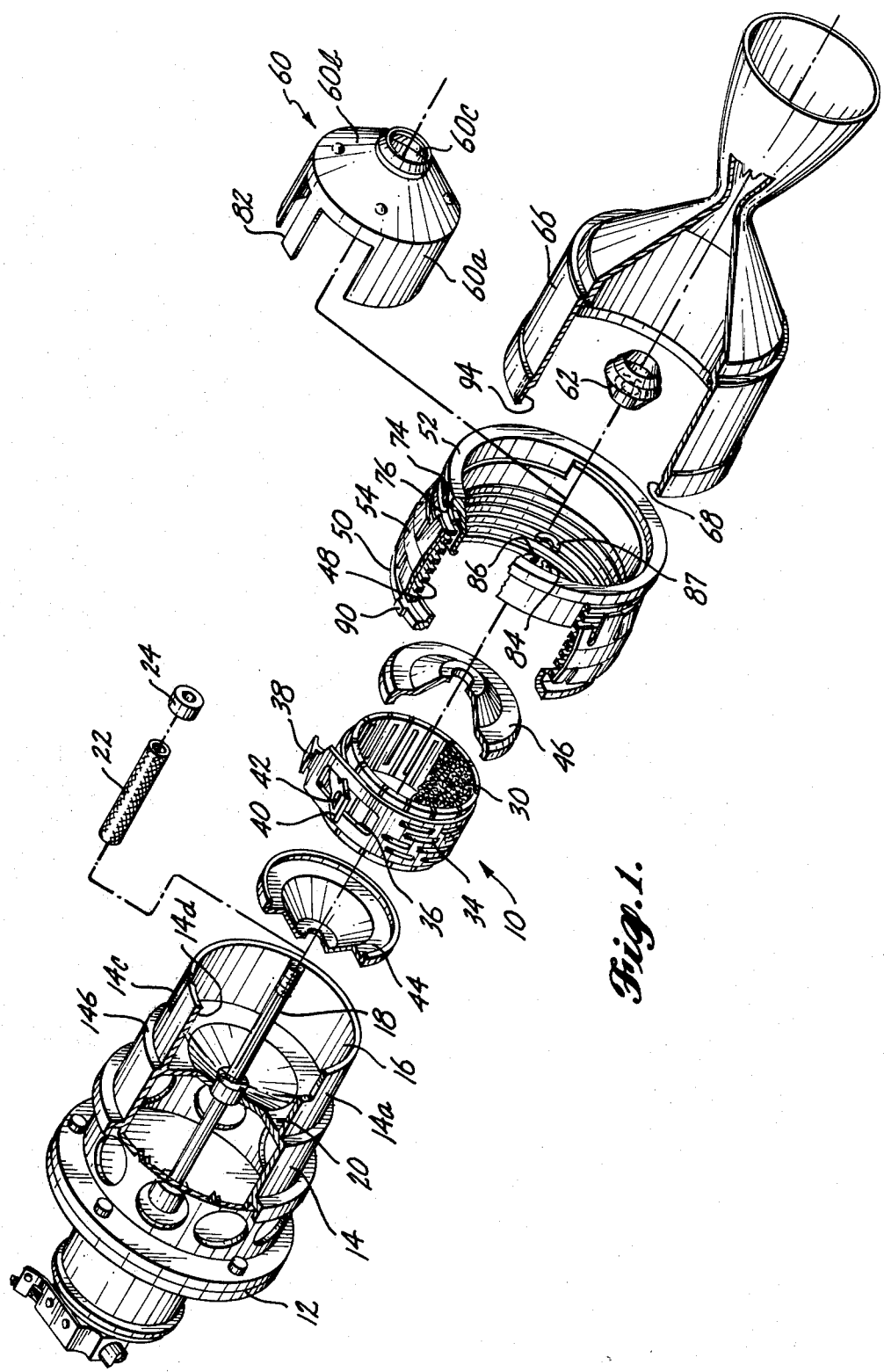
FIG. 1 is an exploded isometric view of a monopropellant rocket engine employing the dynamic catalyst bed retention device of the present invention.
Figure 5:
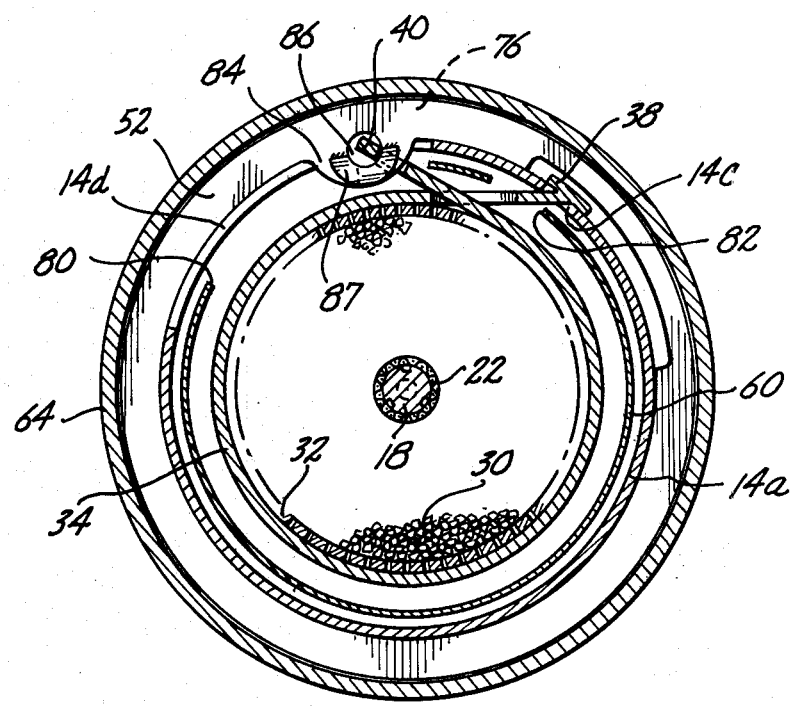
FIG. 5 is a cross-sectional view of the engine taken along section line 5—5 of FIG. 3.

Referring first to FIG. 1, the rocket engine, generally designated 10, includes an engine body 12. The aft portion of the engine body 12 is a radially stepped cylindrical shell that forms a forward thrust chamber body 14. The aft portion 14a of the thrust chamber body 14 has a reduced outer and inner diameter creating a shoulder 14b between the forward portion and the aft portion 14a of the chamber body 14. A fuel supply tube 18 serves as a propellant injector, runs coaxially through the thrust chamber 16, and terminates adjacent the aft end of the aft portion 14a of the forward thrust chamber body. The central portion of fuel supply tube 18 is supported by a support disc 20 oriented orthogonally to the thrust chamber body 14 and to the fuel supply tube 18. The periphery of the support disc 20 is integral with the inner wall portion of the thrust chamber body 14 at a location adjacent and interior of the shoulder 14b. The support disc 20 forms the forward wall of the thrust chamber 16. Propellant is supplied to the thrust chamber 16 via appropriate channels and grooves in the supply tube 18. The channels and grooves exit beneath a cylindrically shaped diffusion screen 22 surrounding that portion of the fuel supply tube 18 positioned in the thrust chamber 16. An annular spacer 24 is positioned around the supply tube 18 aft of the screen 22.

As will be explained in more detail later, the gas-generating catalyst 30, only a portion of which is shown in FIG. 1, is bounded by a radially inwardly compressible bed plate 32. Fore and aft bed caps 44 and 46 axially restrain the catalyst 30. The compression band and bed caps thus restrain the catalyst in a generally cylindrical bed surrounding the diffusion screen 22. The bed plate 32 is surrounded by a compression band 34. The compression band 34 carries a circumferential slot 36 adjacent one end and a hook-shaped bracket 38 adjacent the same end. The other end 40 of the compression band extends through the circumferential groove 36 causing the two ends of the compression band to be arranged in overlapping relationship. The end 40 of the compression band carries an aperture 42, the use of which will be explained in greater detail below.

Referring now to FIGS. 1 and 2, the catalyst-retaining assembly, including the bed plate 32, the compression band 34, the forward bed cap 44, are inserted into the thrust chamber so as to surround the aft end of the propellant supply tube 18 and diffusing screen 22. The annular space within the bed plate is then filled with catalyst 30 (only a portion of which is shown in the figures) and the aft bed cap 46 positioned rearwardly of the bed plate 32 so as to retain the catalyst within the bed plate 32. Although the compression band generally circumferentially surrounds the bed plate 32, the end portions extend away from the bed plate 32 in a generally tangential direction, thus, the one end of the compression band 34 carrying the hook 38 is spaced outwardly from the bed plate 32. When the bed plate and the rest of the catalyst-holding assembly are inserted in the forward thrust chamber body, the one end of the compression band extends through an axially oriented slot 14c in the aft portion 14a of the forward thrust chamber body. The hook 38 secures the one end to the forward thrust chamber body 14 and prevents the one end of the spring from moving circumferentially relative to the bed plate. The other end 40 of the compression band extends through a companion slot 14d in the aft portion 14a of the forward thrust chamber body. The slot 14d extends about 80° to 90° in arc around the aft portion of the thrust chamber body to allow unrestricted movement of the other end 40 of the compression band 34 through a similar arc.

A torsional force is applied to the compression band 34 by a torsional spring 48, which is coupled to a forward spring-retaining ring 50 and a connecting ring 52. The torsional spring 48 is surrounded by an external spring retainer 54 that prevents the torsional spring from assuming other than a generally uniform annular configuration. The spring-retaining ring 50 is sized to slidably and rotatably mount over the forward portion of the thrust chamber body 14 and to abut the forwardly facing surface of the shoulder 56 formed at the forward end of the thrust chamber body. Similarly, the connecting ring 52 is sized to slidably and rotatably engage the aft portion 14a of the thrust chamber body. The forward end of the connecting ring 52 abuts the rearwardly facing surface of shoulder 14b on the outer portion of the thrust chamber body 14. The torsional spring is positioned between the retainer ring 50 and the connecting ring 52, and surrounds the thrust chamber body 14 and also the forward portion of the connecting ring. A thermal liner 60 has a generally cylindrically shaped shell portion 60a, an aft frustoconically shaped portion 60b that converges inwardly and rearwardly to an aft central opening 60c. When assembled the central opening 60c is coaxial with the thrust chamber 16. A bed retainer 62 affixes the aft bed cap 46 and thus the entire catalyst chamber assembly including the aft bed cap, bed plate 32, compression band 34, and forward bed cap 44, on and surrounding the fuel supply tube 18. An aft thrust chamber body 64 surrounds the entire forward thrust chamber body and terminates in a rearward nozzle portion 66. The aft thrust chamber body 64 includes a forward annular shoulder portion 68 that abuts and surrounds the mating shoulder 56 on the forward thrust chamber body.

Referring now to FIG. 2, the spring-retaining ring 50 abuts against the rearwardly facing surface of the shoulder 56. A tab 70 extends forwardly from the retaining ring and engages a detent 72 in one end of the torsional spring 48. The aft end of the spring 48 carries a detent 74 across its upper surface. A mating, forwardly extending tab 76 in the aft upwardly extending shoulder 78 of the connecting ring 52 engages the detent 74 in the spring, thus coupling the spring 48 to the connecting ring 52.

Referring now to FIGS. 1 through 5, a half ring-shaped member 84 extends radially inwardly from the aft portion of the connecting ring 52. The member 84 carries a radial slot 76. The other end 40 of the compression band extends through the radial slot 86 in the member 84 while a portion of the member 84 extends through the aperture 42 in the other end 40. A half-ring 87 is then mated to the member 84 to close the radial slot 86 in the member 84. The half-ring 87 is then permanently affixed to the member 84 as by welding. In this manner, the other end 40 of the compression band is securely affixed to the connecting ring 52.

Once the catalyst-holding assembly, forward retainer ring 50, and spring-connecting ring 52 are in place, the bed retainer 62 is threadably engaged onto the aft portion of the fuel supply tube 18, thus securing the catalyst-retaining assembly in place. Thereafter, the spring retainer 54 is inserted over the torsional spring 48. Thereafter, the thermal liner 60 is inserted into the assembly so that the cylindrical shell 60a is interposed between the retainer spring 54 and the inner surface of the forward thrust chamber body 14. It should be noted that the thermal liner 60 also carries a pair of slots 80 and 82 corresponding in size and location to the slots 14c and 14d in the aft portion of the forward thrust chamber body 14.

The aft thrust chamber body 64 fits over the rear portion of the forward thrust chamber body so that the radially inwardly facing surface of the shoulder 68 engages the outwardly facing circumferential surface of the shoulder 56 on the forward thrust chamber body. The rearwardly facing surface of shoulder 56 and the forwardly facing surface of shoulder 68 overlap slightly in abutting relationship to index the axial position of the aft body 64. A radially upwardly extending tab 90 (FIGS. 4 and 5) on the forward spring retainer ring 50 engages a detent 94 extending rearwardly from the shoulder 68 when the aft thrust chamber body 64 is in place. The aft thrust chamber body 64 is rotated in a counterclockwise direction prior to fastening it to the forward thrust chamber body 14 to wind the torsion spring 48. So winding the torsion spring 48 applies a torsional force to the other end 40 of the compression band 34 through the connecting ring. When a predetermined torsional force has been applied to the other end 40 of the compression band 34, the aft thrust chamber body is firmly secured to the forward thrust chamber body in a conventional manner, for example, by welding a bead 98 between the shoulder 56 and the forward end of the aft thrust chamber body 64 as indicated in FIG. 3.

In operation, as voids are formed in the catalyst bed, the predetermined torsional force applied to the compression band 34 via the torsion spring 48 will constantly apply a radially inwardly directed force to the bed plate 32. This force is adequate to compress the bed plate 32 inwardly as voids are formed, thus readjusting the catalyst bed so as to fill the voids created during operation. So filling the voids during operation of the engine achieves the intended purposes of retaining uniform impulses from the rocket engine as propellant is fed to the catalyst bed through a large number of repeated power cycles. A structure constructed in accordance with the present invention will withstand in excess of $10^6$ impulses, or power cycles, when utilized in an engine having a nominal thrust of five pounds force. Thus, the original objectives of the present invention have been met by a simple, reliable, and effective device.

The catalytic gas generator and dynamic retention device of the present invention have been described in relation to use in a small rocket engine. One of ordinary skill in this art, after reading the foregoing specification will be able to effect various alterations, substitutions of equivalents, and other changes in the gas generator and dynamic retention device without departing from the broad concepts disclosed herein. Further, the gas generator and dynamic retention device can be employed not only in rocket engines, but also in other gas-generating applications. For example, gas generators for small gas turbines can equally benefit from incorporation of the improved dynamic retention device. Thus, the term "propellant" as used herein is not limited to compositions employed in monopropellant rocket engines, but includes other compositions that react in the presence of a catalyst to generate a high-temperature, power-producing gas. It is therefore intended that the protection afforded by Letters Patent granted hereon be limited only by the definition contained in the appended claims and equivalents thereof.

The embodiments of the invention in which an exclusive property or privilege is claimed are defined as follows:

1. In a catalytic gas generator including body means defining a generating chamber, a propellant inlet, a propellant outlet, and a generally cylindrical catalyst bed, the improvement comprising:
   first means surrounding and radially confining said catalyst bed, said means being movable radially inwardly relative to said bed,
   second means cooperating with said first means to apply a biasing force directed radially inwardly relative to said bed to move the first means radially inwardly and compress the bed as voids form therein during operation of the gas generator.

2. The gas generator of claim 1 wherein said first means is movable radially inwardly over a predetermined radial distance, said biasing force being substantially constant over said distance.

3. The gas generator of claim 1 wherein said biasing force is applied uniformly around said first means.

4. The gas generator of claim 1 further comprising:
   third means defining a radially compressible bed plate interposed between said first means and said catalyst bed.

5. The gas generator of claim 1 or 4 wherein said first means comprises a compression band surrounding said catalyst bed and having first and second ends, said first end being affixed to said body means, said second means being operatively coupled to said second end so as to apply a torsional force thereto, said torsional force being directed to move said first and second ends relative to each other so as to reduce the diameter of said compression band.

6. The gas generator of claim 1 wherein said catalyst bed has fore and aft end portions, said catalyst bed being axially confined both in the fore and aft directions.

7. In a catalytic gas generator including body means defining a generating chamber, a propellant inlet, a propellant outlet, and a generally cylindrical catalyst bed, the improvement comprising:
   a compression band surrounding and radially confining said catalyst bed, said band having first and second overlapping ends, said first end being affixed to said body means,
   a radially compressible bed plate interposed between said compression band and said catalyst bed, and
   means operatively coupled between said second end of said band and said body means for applying a torsional force to said band, said torsional force being directed to move said first and second ends apart to reduce the diameter of said band and thereby apply a radially inwardly directed biasing force to said band.

8. The gas generator of claim 8 wherein said second means comprises:
   a torsion spring having first and second end portions, means connecting said first end portion to said body means, said second end portion being affixed to said second end of said compression band.

* * * * *